Figure 4:
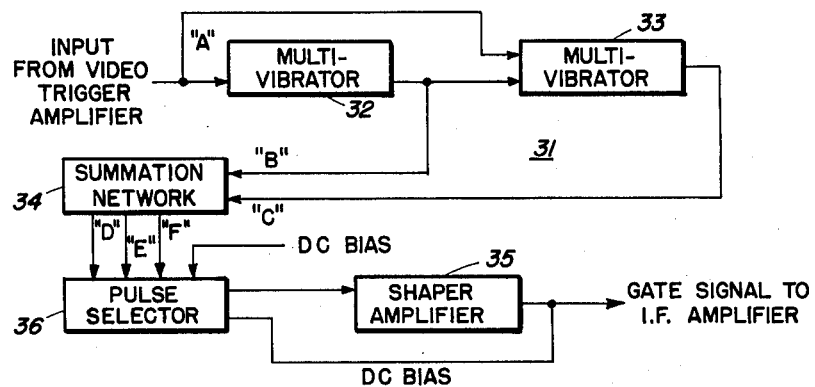

Jan. 18, 1966     R. C. HILLIARD     3,230,451
SELECTIVE GATING SYSTEM FOR HIGH FREQUENCY SPECTRUM ANALYZER
Original Filed Jan. 8, 1962     3 Sheets-Sheet 1
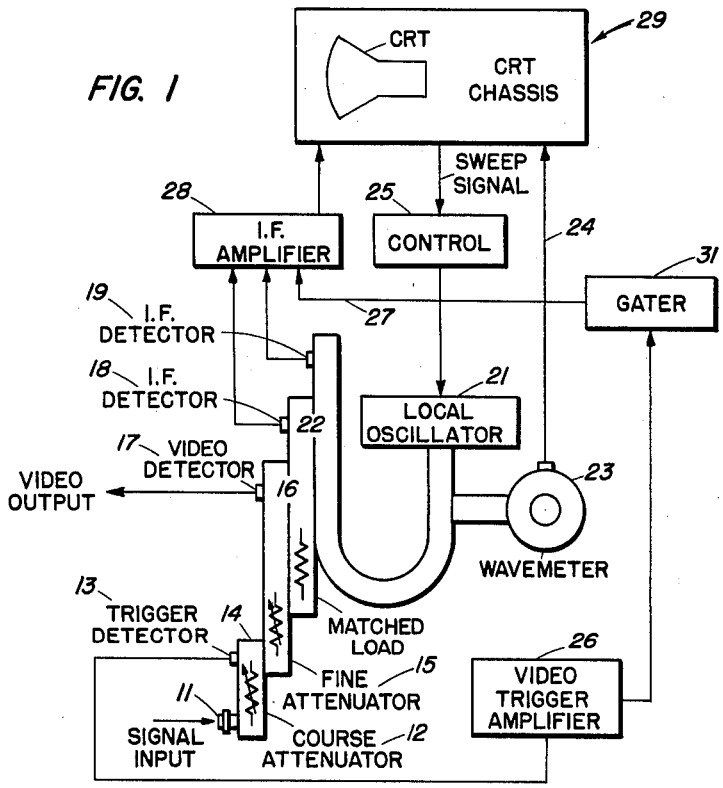
FIG. 1
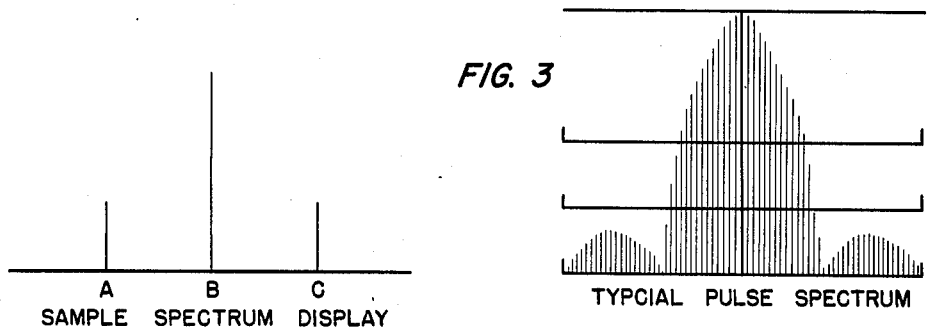
FIG. 2
FIG. 3
INVENTOR
*Robert C. Hilliard*
BY *Claude Funkhouser*
ATTORNEY Jan. 18, 1966 R. C. HILLIARD 3,230,451
SELECTIVE GATING SYSTEM FOR HIGH FREQUENCY SPECTRUM ANALYZER
Original Filed Jan. 8, 1962 3 Sheets-Sheet 2

United States Patent Office 3,230,451
Patented Jan. 18, 1966

3,230,451
SELECTIVE GATING SYSTEM FOR HIGH FREQUENCY SPECTRUM ANALYZER
Robert C. Hilliard, Hampton Falls, N.H., assignor, by mesne assignments, to the United States of America as represented by the Secretary of the Navy
Continuation of application Ser. No. 165,048, Jan. 8, 1962. This application Sept. 16, 1963, Ser. No. 309,360
6 Claims. (Cl. 324—77)

This invention relates to a selective gating system. More particularly, the invention relates to a selective gating system which gates predetermined pulses from a train of pulses which are to be analyzed.

This application is a continuation of application Serial No. 165,048, filed January 8, 1962, now abandoned.

The selective gating system, comprising the instant invention is best understood in connection with a spectrum analyzer functioning as a gating signal generator to develop pulses which are used for gating an IF amplifier in the analyzer "on" and "off" thereby allowing observation of the spectra of individual pulses from a pulse group being analyzed by the spectrum analyzer.

A spectrum analyzer may be used, for example, in a radar test set. A typical analyzer in which the gating system of the present invention finds utility is capable of displaying separately on a cathode ray tube screen, the RF spectrum of individual pulses of a coded pulse group, or the combined spectrum of all the pulses in the group. From such a spectrum display, measurements can be made of relative and absolute frequency, side lobe amplitude, and sweep frequency. It is also possible to determine if all of the desired pulses are present in code group.

The spectrum analyzer receives a pulsed RF signal from the unit under test for example, a radar set or radar simulator. The incoming signal is sent through coarse and fine signal attenuators to a microwave balanced mixer where it is combined with a local oscillator signal in a mixer circuit. The output of the mixer is then fed to a highly selective, fixed frequency, superheterodyne circuit which in turn amplifies and detects the mixer output and applies the detected signal to the vertical axis of a cathode ray tube. A saw-tooth generator provides a linear sweep voltage for the cathode ray tube horizontal axis, and simultaneously sweeps the local oscillator frequency above its nominal value so that the frequency of a spectrum component is represented by its horizontal position on the cathode ray tube screen. Both the sweep frequency and the total amount of frequency change from the local oscillator frequency may be varied. The gating unit in the spectrum analyzer uses detected and amplified input RF pulses to provide a control signal which permits the IF amplifier to pass only a desired portion of the pulses. This is the gating operation. This allows the individual spectrum of any or the combined spectrum of all of the pulses of the group to be observed.

Thus, the gate generator provides signal-triggered gate pulses for gating the IF amplifier. This enables the presentation of the frequency spectrum of any one or all of a plurality of pulses in a pulse group presented to the spectrum analyzer. This function is performed by the gating means sub-circuits which comprise multivibrators, a summation amplifier, and a pulse selector and shaping circuit. The resultant efficiency and simplicity of parts provides an advantage over systems used heretofore by providing a spectrum analyzer with means to pre-select a given group of pulses for separate independent analysis.

It is an object of this invention to provide a selective pulse gating system.

It is a further object of this invention to provide a pulse gating system wherein any one of a group of pulses may be selected for analysis.

A still further object of this invention is to provide a gating generator whereby selected groups of pulses may be presented in a condition to be analyzed on a spectrum analyzer.

Another object of this invention is to provide a means for selecting one of a plurality of pulses in a pulse group on the basis of its order or occurrence and independent of the time interval between pulses or the entire group of pulses.

Figure 5:
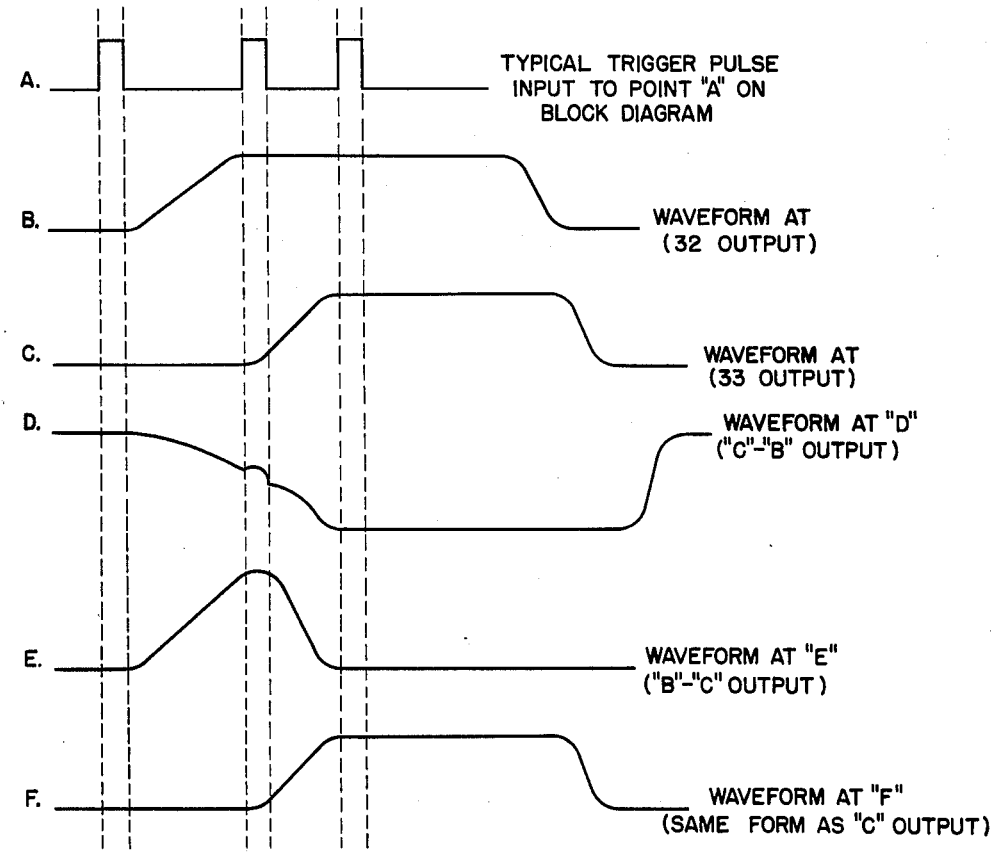
Figure 6:
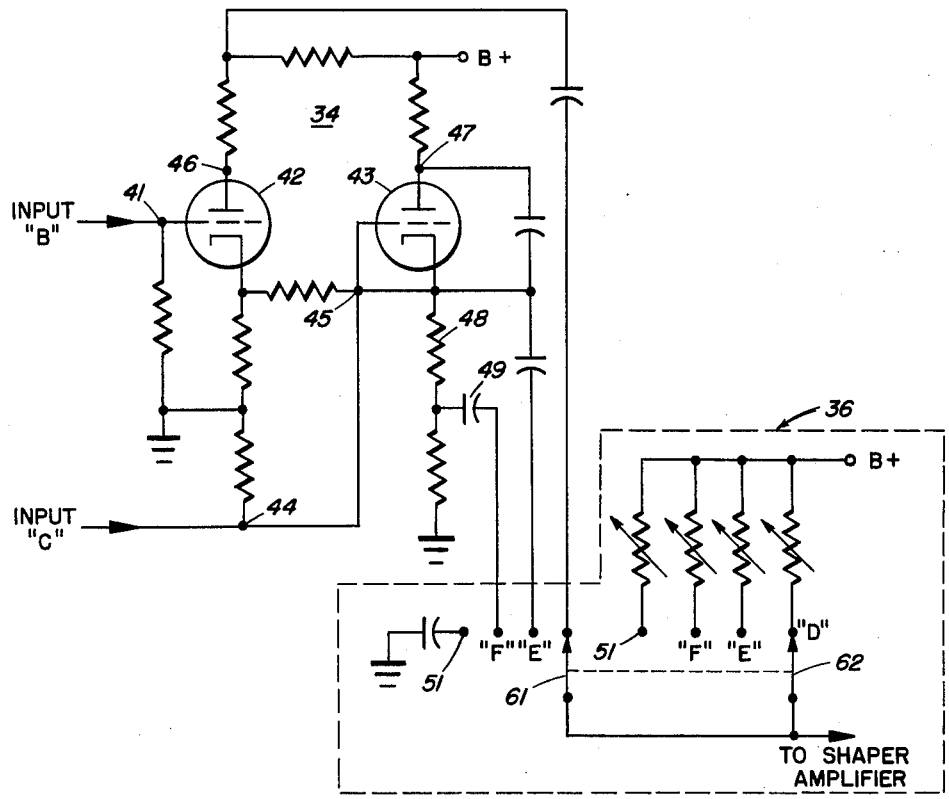

Other objects and many of the attendant advantages of this invention will be readily appreciated as the same becomes better understood by reference to the following detailed description when considered in connection with the accompanying drawings wherein:

FIG. 1 is an overall block diagram of a typical spectrum analyzer in which the present invention finds utility;
FIG. 2 is a simple spectrum display;
FIG. 3 is a typical pulse spectrum display;
FIG. 4 is a block diagram of the gating generator of the present invention;
FIG. 5 is a comparative plot of typical signal waveforms at different points within the generator of FIG. 4; and
FIG. 6 is a partial schematic drawing of the sum and difference circuit and pulse selector circuit of the gating generator.

In FIG. 1 there is shown in block diagram form a typical spectrum analyzer in which the present invention finds utility; the function performed thereby being the analysis and display of a pulse spectrum. In typical operation, an input signal is fed into the spectrum analyzer at signal input 11, through an attenuator 12 and thence to detecting crystal 13 and a directional coupler combination 14. The crystal rectifies the input pulses to provide trigger pulses to a pulse gating circuit, as seen below. The directional coupler 14 routes the input signal through a fine attenuator 15 and through a second directional coupler 16 to a video detector crystal 17 the output of which may be used in other portions of a test set (not shown). The output of coupler 16 is also fed to a matched pair of crystals 18 and 19, which are used to detect the intermediate frequency difference between the input signal and a local oscillator 21 signal. Crystal 18 receives the input signal directly, while crystal 19 is fed by a third directional coupler 22. The local oscillator 21 has a microwave signal fed directly to IF detector 19, and to detector 18 by directional coupler 22. The directional coupler thus provides a split path to feed the balanced detectors and also minimizes interaction between the local oscillator 21 and the input signal.

The local oscillator frequency is continually swept in saw-tooth fashion through a selected mode of operation by the application of a saw-tooth voltage to the repeller of the oscillator (not shown). This same saw-tooth voltage is also applied to the horizontal deflection plate of the cathode ray tube (not shown) thereby setting up the horizontal dimension of the cathode ray tube face to indicate frequency. The exact frequency calibration is provided by a resonant cavity wavemeter 23 connected to the waveguide in the path of the local oscillator signal. As the local oscillator frequency sweeps past the resonant frequency of the cavity, the oscillator energy is detected by crystal 23 and applied to the cathode ray tube input 24 to produce a marker pip on the display base-line. The resonant cavity wavemeter 23 is tunable throughout the entire spectrum analyzer band. A control circuit 25 is also provided for identification of the proper signal, so that the local oscillator is not tuned to an undesired image of the signal.

The spectrum display is generated as in the following example. Assume a 9,000 mc. input signal is being amplitude-modulated by a pure 2 mc. sine wave. The frequencies present are the carrier frequency and the upper and lower sidebands. Assume that the sweep generator voltage and local oscillator center-frequency have been adjusted to produce a local oscillator frequency sweeping between the limits of 9036 mc. and 9044 mc. The cathode ray tube beam is being swept across the face of the display tube 29 in synchronization with the sweep frequency of the local oscillator. When the beam has swept through the first one quarter of its travel, the local oscillator frequency has reached 9038 mc. and heterodynes with the input signal sideband at 8998 mc., to produce the required IF difference frequency. This is detected at the output of the IF amplifier 28 to produce a voltage pulse which is applied to the vertical deflection plates of the cathode ray tube 29. This produces a vertical line, which is shown at A in FIG. 2. The sweep voltage continues and drives the cathode ray tube beam to the center of the screen and the local oscillator frequency to the center of its band, 9040 mc. where it heterodynes with a 9000 mc. carrier to produce a strong pulse to the vertical deflection plates and creates the vertical line shown at B in FIG. 2. The beam and local oscillator frequency continue sweeping and produce the required pulse again at point C when the 9002 mc. signal sideband and the instantaneous 9042 mc. local oscillator frequency heterodyne at 40 mc. The height of each vertical line is proportional to the input power at that frequency. Thus, the scope display is a graph of frequency versus power. The result is an easily readable, highly accurate frequency marker.

In the simple spectrum shown in FIG. 2, only three frequencies are present, since the modulating frequency is a pure sine wave, producing only two sidebands. When a carrier is pulse-modulated (the usual case with radar) many modulating frequencies are present, each producing its upper and lower sideband. Since the square shape of the modulating pulse contains odd harmonics, the pulse spectrum appears as shown in FIG. 3 with nodes at even multiples of the "basic modulating frequency." (The "basic modulating frequency" is related directly to the width of the modulating pulse, since the carrier sees that width as a positive half cycle sine wave, steepened and chopped by the addition of odd harmonics of that sine wave.) The pulse repetition frequency also creates sidebands, which help populate the area between the nulls, along with the frequencies produced by inadvertent frequency modulating and amplitude modulating of the RF carrier during the pulse period.

The spectrum shown in FIG. 3 might be expected of a microwave source keyed by single pulses appearing at some specified pulse repetition frequency. However, many radar systems and radar simulators are keyed not by single pulses but by groups of pulses with the pulse groups appearing at some specified pulse repetition frequency. Since the separate pulses within a group are often generated in separate circuits, they seldom contain exactly the same frequency components. Thus, in order to completely evaluate the spectrum of a multiple pulse carrier, it is necessary to provide a gate in the spectrum analyzer, which will open on preselected pulses of each pulse group. In this way, the spectrum from each pulse of the group can be separately examined and adjusted as necessary. The gating circuit 31 of the instant system utilizes the input signal pulses themselves, as detected at the trigger detector and video amplifier 26, to key a pair of multivibrators whose output pulses are applied to a manual selector switch. This switch selects a proper combination of multivibrator pulses and combines them with a bias voltage to produce a gating signal. This signal in line 27 turns the IF amplifier 28 off and on at the times required, thus preventing all signal pulses except the selected one from reaching the vertical deflection plates of the cathode ray tube 29. In one position of the switch, a D.C. bias replaces the gating signal so that the spectrum of all pulses of a group can be viewed simultaneously.

In FIG. 4 there is shown, in block diagram form, a gate generator 31 used in the instant spectrum analyzer, which provides a signal-triggered gate voltage for gating the IF amplifier 28 regardless of time intervals between pulses. FIG. 1 should be referred to for the interconnection of these units. This gating enables the presentation of the frequency spectrum of any one of the pulses in a pulse group or of the entire group to the cathode ray tube 29. The gate generator is provided with triggering signals from the video trigger amplifier 26 which occur simultaneously with the pulses of the group.

The waveforms of a typical group are shown in FIG. 5 for the purpose of time comparison with other waveforms, each waveform being identified by a letter of the alphabet and originating at the correspondingly identified location on the block diagram of FIG. 4. The first output pulse of the video trigger amplifier 26 drives the unistable multivibrator 32 which produces an output signal at B and may be seen to be a positive square wave which begins slightly after the first pulse and ends considerably after the third pulse constituting a wide band square wave. This output also drives unistable multivibrator 33. When the output of vibrator 32 becomes positive, it raises the bias level of vibrator 33 so that the second pulse from video trigger amplifier 26 is able to trigger multivibrator 33. The output waveform of multivibrator 33 is a positive square wave which begins slightly after the second pulse and ends considerably after the third pulse. This wave form may be seen in FIG. 5 at C.

The summation network 34 produces three different outputs which are derived from the B and C signals. The output at D is an inverted version of the B waveform and may be seen in FIG. 5. The output at E, is produced by subtracting (inverting and summing) the C signal from the B signal. This waveform is a positive square wave which starts slightly before and ends slightly after the second pulse. At F the waveform is identical in shape and polarity to the C signal.

The outputs of the summation network are selected and fed to the input of the shaper amplifier 35 by the pulse selector switch 36, which is a manual switch. When the D signal is applied to the input of the shaper amplifier 35 and a zero volt D.C. bias is applied to the output, during the first pulse the D.C. bias allows the gated IF amplifier 28 to conduct and to amplify. However, shortly after the first pulse, the D signal goes negative, causing the shaper amplifier output to become negative. This drives the IF amplifier to a cut-off point and blocks the second entered pulses. This prohibits passage of the second and third pulses and allows observation of the spectrum of the first pulse alone.

In the second and third pulse positions of the pulse selector switch 36, a negative D.C. bias is applied to the shaper amplifier output to hold the IF amplifier at cut-off, except during times when the input thereto is driven positive. In the second pulse position, the signal at E drives the shaper amplifier, allowing the IF amplifier to conduct and amplify only during the second pulse. In a third position of the function selector switch, the shaper amplifier is driven by the signal at F and thus allows conduction of the IF amplifier only during the third pulse. In the fourth position of the pulse selector switch, the zero-volt D.C. bias is applied to the IF amplifier continuously so that it conducts and amplifies during all three pulses, making it possible to view the combined spectrum resulting from the three pulses combined.

The elements 32 and 33 are conventional cathode coupled monostable multivibrators as shown in Pulse and Digital Circuits, by the Millman and Taub. (McGraw-Hill Book Co., Inc., New York, 1956), on page 187, Fig. 6–10, and explained in Section 6–6, page 187 et seq.

The summation network or difference amplifier 34 and pulse selector 36 are shown in FIG. 6. The summation network is similar in operation to that shown in Electron Tube Circuits, by Seely (McGraw-Hill Co., Inc., New York, 1950), on page 113, Fig. 6–20, and described in Section 6–9, page 113 et seq.

Input B from multivibrator 32 is applied to terminal 41 which is in the grid circuit of triode 42. Similarly, input C from multivibrator 33 is applied to the grid of tube 43 through terminals 44 and 45 and the outputs D and E are C−B and B−C outputs raised to appropriate D.C. levels as explained hereinbefore by the action of pulse selector 36 which consists of two multi-position switches 61 and 62 ganged together; one providing appropriate outputs from the network 34 and the other providing the appropriate D.C. level to such signals. The D and E outputs are taken from points 46 and 47 shown by Seely as $e_{o1}$ and $e_{o2}$. The F waveform so shown in FIG. 5 which is the same shape as the C waveform is obtained by bypassing the tube circuits of summation network 34 following the path from terminals 44 and 45 through coupling resistor and capacitors 48 and 49, respectively. When the combined spectra of all the pulses is desired, the outputs D, E and F are switched out of the circuit and terminal 51 of the pulse selector is used, thereby providing a D.C. voltage alone to the IF amplifier 28, as noted hereinbefore.

The pulse shaper 35 may be any conventional type, for example, the trigger of Figs. 19–12 on page 419 of Seely.

From the foregoing, it is shown that the present invention provides a gating circuit for a pulse group which allows selection of one of the pulses of the group, entirely on the basis of its order of occurrence, independent of other considerations such as time relation, or passage of the entire group of pulses.

Obviously many modifications and variations of the present invention are possible in the light of the above teachings. It is therefore to be understood that within the scope of the appended claims the invention may be practiced otherwise than as specifically described.

I claim:

1. In a spectrum analyzer for displaying the frequency spectra of preselected individual pulses of a pulse group, or the spectrum of the entire pulse group, regardless of the relative time position of any pulse therein, having first means for receiving said pulse group in the form of RF energy and converting said pulses to IF energy; second means having a control point for converting said IF energy pulses to video pulses and connected to said first means; third means for displaying the frequency spectra of said video pulses and connected to said second means; fourth means for providing triggering pulses and connected to said first means; the invention comprising:

fifth means for providing gating signals to said second means upon activation by said triggering pulses connected between said second and fourth means;

a plurality of multivibrator stages connected in series relationship one to another and coupled to receive triggering pulses from said fourth means, the first of said stages being activated by one of the triggering pulses and the following stages being activated by the combination of other ones of said triggering pulses and the output pulse of the stage preceding; combining means for combining said output pulses from said stages and thereby providing gating signals, said combining means connected to said control point of said second means whereby said gating signals are applied to said second means; and a manual multiposition switch connected between said combining means and said second means for providing selected ones of said gating signals.

2. The apparatus of claim 1 wherein said fifth means further includes:

a shaping amplifier connected between said manual switch and said second means.

3. The apparatus of claim 1 wherein said fifth means further includes:

a source of D.C. voltage which is connected to said switch.

4. The apparatus of claim 1 wherein said combining means is a summation network.

5. The apparatus of claim 4 wherein said summation network is a difference amplifier.

6. The apparatus of claim 2 wherein said fifth means further includes a source of D.C. voltage connected to said switch and said combining means is a difference amplifier.

References Cited by the Examiner

UNITED STATES PATENTS

| 2,403,982 | 7/1946 | Koenig | 324—77 X |
|---|---|---|---|
| 2,905,894 | 9/1959 | Rudmann | 324—79 X |
| 2,911,564 | 11/1959 | Jaffe et al. | |
| 2,967,273 | 1/1961 | Hurvitz | 324—77 |
| 2,973,478 | 2/1961 | Hurvitz | 324—77 |
| 3,165,586 | 1/1965 | Campanella | 324—77 X |

OTHER REFERENCES

Tele-Tech, April 1947, "Microwave Spectrum Analyzers," pages 35–38.

Electronics, August 1956, "Gate Selects Pulses for Spectrum Analysis," pages 179–181.

WALTER L. CARLSON, *Primary Examiner.*

ADDISON E. RICHMOND, JR., *Assistant Examiner.*